US011940021B2

(12) United States Patent
Reimchen et al.

(10) Patent No.: US 11,940,021 B2
(45) Date of Patent: Mar. 26, 2024

(54) ROLLER FREEWHEEL HAVING AN AXIS OF ROTATION FOR TORQUE TRANSMISSION DEPENDING ON THE DIRECTION OF ROTATION, A METHOD FOR MANUFACTURING A ROLLER FREEWHEEL, AND A MANUFACTURING FACILITY FOR SUCH A MANUFACTURING METHOD

(71) Applicant: Schaeffler Technologies AG & Co. KG, Herzogenaurach (DE)

(72) Inventors: Alexander Reimchen, Herzogenaurach (DE); Frank Schoenstein, Baiersdorf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 44 days.

(21) Appl. No.: 17/430,044

(22) PCT Filed: Dec. 10, 2019

(86) PCT No.: PCT/DE2019/101063
§ 371 (c)(1),
(2) Date: Aug. 11, 2021

(87) PCT Pub. No.: WO2020/164656
PCT Pub. Date: Aug. 20, 2020

(65) Prior Publication Data
US 2022/0136570 A1 May 5, 2022

(30) Foreign Application Priority Data

Feb. 14, 2019 (DE) ..................... 10 2019 103 704.2

(51) Int. Cl.
*F16D 41/067* (2006.01)

(52) U.S. Cl.
CPC .... *F16D 41/067* (2013.01); *F16D 2250/0023* (2013.01); *F16D 2250/0084* (2013.01)

(58) Field of Classification Search
CPC .......... F16D 41/067; F16D 2250/0023; F16D 2250/0084
See application file for complete search history.

(56) References Cited

U.S. PATENT DOCUMENTS 3,087,590 A * 4/1963 Gorsky ................. F16D 41/066
192/45.02
3,935,753 A 2/1976 Williams
(Continued)

FOREIGN PATENT DOCUMENTS

CN 202301448 U 7/2012
DE 102015221564 A1 5/2017
(Continued)

*Primary Examiner* — Huan Le

(57) ABSTRACT

A roller freewheel includes a roll body cage, a plurality of roll bodies accommodated in the roll body cage, and a ramp ring having a ramp contour. The ramp contour blocks the roll bodies in a first direction of rotation and allows rotation of the roll bodies relative to the ramp ring in a second direction of rotation, opposite the first direction of rotation. The ramp contour is designed to accommodate a plurality of roll body rows. The roll body cage includes a plurality of separate partial cages, with each partial cage including at least one roll body row.

8 Claims, 2 Drawing Sheets

(56) References Cited

U.S. PATENT DOCUMENTS

| | | | |
|---|---|---|---|
| 4,664,237 A | | 5/1987 | Lederman et al. |
| 6,006,881 A | | 12/1999 | Lederman et al. |
| 7,975,819 B2 | * | 7/2011 | Altmann ............... F16D 41/067 60/345 |
| 2009/0260941 A1 | | 10/2009 | Altmann et al. |

FOREIGN PATENT DOCUMENTS

| | | | |
|---|---|---|---|
| DE | 102016213622 A1 | | 2/2018 |
| DE | 102021115549 A1 * | | 8/2022 ........... F16D 41/066 |
| EP | 2148109 A1 | | 1/2010 |

* cited by examiner

ROLLER FREEWHEEL HAVING AN AXIS OF ROTATION FOR TORQUE TRANSMISSION DEPENDING ON THE DIRECTION OF ROTATION, A METHOD FOR MANUFACTURING A ROLLER FREEWHEEL, AND A MANUFACTURING FACILITY FOR SUCH A MANUFACTURING METHOD

CROSS-REFERENCE TO RELATED APPLICATIONS

This application is the U.S. National Phase of PCT Appln. No. PCT/DE2019/101063 filed Dec. 10, 2019, which claims priority to DE 10 2019 103 704.2 filed Feb. 14, 2019, the entire disclosures of which are incorporated by reference herein.

TECHNICAL FIELD

The disclosure relates to a roller freewheel having an axis of rotation for torque transmission depending on the direction of rotation, as well as a method for manufacturing a roller freewheel.

BACKGROUND

Roller freewheels of a variety of different types are known from the prior art. Frequently, roller freewheels are commissioned at an early stage in the design of an application and/or there are subsequent changes with regard to the (maximum) transmittable torque. Until now, this has required a new calculation and design of such a roller freewheel. This therefore represents a significant cost factor.

SUMMARY

It is desirable to at least partially overcome the disadvantages known from the prior art.

A roller freewheel has an axis of rotation for torque transmission depending on the direction of rotation, having at least the following components:
  a roll body cage;
  a plurality of roll bodies, the roll bodies being housed in the roll body cage; and
  a ramp ring having a ramp contour for blocking the roll bodies with the ramp contour in a first direction of rotation and for allowing rotation of the roll bodies relative to the ramp ring in the opposite, second direction of rotation.

The ramp contour of the ramp ring is designed to house a plurality of roll body rows; and the roll body cage comprises a plurality of separate partial cages, each partial cage comprising at least one roll body row.

In the following, if the axial direction, radial direction or the circumferential direction and corresponding terms are used without explicitly indicating otherwise, reference is made to the mentioned axis of rotation. Unless explicitly stated otherwise, ordinal numbers used in the previous and subsequent descriptions are used only for the purposes of clear distinction and do not indicate the order or ranking of the designated components. An ordinal number greater than one does not necessarily mean that another such component must be present.

The roller freewheel is designed for torque transmission depending on the direction of rotation around an axis of rotation, so that in a first direction of rotation, for example clockwise, an applied torque is (completely) transmitted almost without loss around the axis of rotation. In a second direction of rotation, which is opposite to the first direction of rotation, corresponding for example to the counterclockwise direction, a torque cannot be transmitted or reduced to a negligible size or can be transmitted to an acceptable drag torque.

The roll bodies, for example balls or cylindrical rollers, are housed in a roll body cage and are arranged therein in a defined manner. The roll bodies are also pretensioned radially against the ramp ring by the roll body cage.

The ramp ring has a ramp contour by means of which a respective roll body is held in a form-fitting manner in the first direction of rotation, for example as a result of an abrupt reduction in diameter, when the ramp ring is rotated relative to the respective roll body in interaction with the radial pretensioning of the roll body. In the second direction of rotation, on the other hand, the respective roll body can be rotated relative to the ramp ring, for example as a result of a gentle reduction in diameter, which can thus be overcome against the pretensioning by means of the roll body cage.

The ramp contour of the ramp ring proposed here is designed to house a plurality of axially adjacent roll body rows. The roller freewheel is therefore designed to transmit a torque that corresponds to the sum of the respective (maximum) transmittable torque of each individual roll body row. Since only a single (common) ramp ring is provided, the roll body rows are always synchronized with one another with regard to their freewheeling function or at least when torque is applied.

For this purpose, the roll body cage comprises a plurality of separate partial cages, each partial cage comprising at least one roll body row. Since the roll body cage, unlike before, comprises a plurality of partial cages, a high degree of flexibility is set with regard to the number of roll body rows in the roller freewheel. If the (maximum) torque to be transmitted changes, the number of roll body rows is adapted accordingly, for example the number is increased if the (maximum) torque to be transmitted is increased. A new design or even calculations are then not necessary.

In one embodiment, the partial cages can be connected to one another before or during assembly, for example in a form-fitting manner. The partial cages are preferably mounted loosely to one another and thus adjust themselves relative to one another or relative to the ramp contour as a result of the applied torque. Adjustment during assembly and a high manufacturing tolerance are not required with this loose embodiment.

According to a further aspect, such a roller freewheel can be used for a plurality of applications and does not have to be redesigned and adapted for each order. Instead, a gradually variable torque range is offered and the roller freewheel is equipped with a corresponding number of roll body rows as required.

The partial cages may be formed identically.

In this embodiment, the parts are largely identical, so that the number of parts is high and production costs are thus reduced. In addition, assembly safety is increased if there is only a single type of partial cage. Furthermore, the distance between the roll bodies of the one or more roll body rows of a partial cage is identical compared to another (identical) partial cage within the manufacturing tolerance of the machine tools involved, i.e., a tolerance deviation between the partial cages is smaller than with different (for example identical) machine tools.

The partial cages may each include only a single roll body row.

In this embodiment, the flexibility with regard to the adjustable (maximum transferable) torque is particularly great. If a total of about one to four roll body rows is in the range of possible applications, the assembly effort is also within a time frame that is permissible in terms of costs. Furthermore, the above-mentioned costs are correspondingly reduced due to the large number of partial cages.

The ramp contour may have an axial length that corresponds to the sum of the axial widths of insertable partial cages.

In this embodiment, the axial length of the ramp contour corresponds to the sum of insertable partial cages with, under certain circumstances, different widths. In this embodiment, the ramp contour is flexibly designed for the respectively desired number of roll body rows, i.e., in accordance with the desired (maximum) transmittable torque. In one embodiment, the axial length of the ramp contour corresponds to a multiple of an axial width of a partial cage. For this purpose, the insertable partial cages are designed with an identical width, preferably designed identically as a whole. If the highest torque that can be covered can be transmitted, for example, with four roll body rows, the length of the ramp contour corresponds to four times the width of the insertable partial cage.

The ramp ring may have a raw length in production that can be individually shortened, preferably cut off, to a certain length.

In this embodiment, the ramp ring can be shortened for an application to the length corresponding to the required (maximum) torque, for example by means of cutting off. Thus, only as much axial installation space is required as the number of roll body rows requires.

According to a further aspect, for example, when there is a high number of orders, ramp rings can already be prefabricated and then shortened accordingly for the individual requirement.

The ramp ring may have an axial end stop on one side and an open side opposite thereto, the roll body rows being axially insertable into the open side.

In this embodiment, assembly can be carried out in a particularly simple manner in that the roll body rows (in the partial cages) are simply pushed axially. In one embodiment, after the roll body rows have been pushed in, the open side is turned over to a stop, for example by means of flanging.

According to a further aspect, a method for manufacturing a roller freewheel is proposed, having at least the following components:
a. Producing a ramp ring having a ramp contour with a predetermined raw length, preferably by means of deep drawing;
b. Determining a torque to be transmitted in the first direction of rotation;
c. Determining a corresponding number of roll body rows in a roll body cage with a certain width;
d. Adapting the raw length of the ramp contour to the width of the number of roll body rows determined in step c., wherein the raw length adapted in this way corresponds to the length of the ramp contour in the final state; and
e. Introducing the determined number of roll body rows into the adapted ramp ring.

It should be pointed out at the outset that the sequence of steps shown merely represents a preferred sequence and that the steps can also be carried out in a different sequence. The only sequencing required is that step a. must be completed before step d. and step e. then step b. before step c., and steps b. and c. must be completed at least before step d.

The rolling bearing produced in this way may comprise a single, one-piece roll body cage, the roll body cage thus corresponding to a partial cage according to the roller freewheel described above. Such a roll body cage comprises one or more roll body rows. For example, otherwise or in an embodiment with two or more partial cages, the roller freewheel, which is produced with this manufacturing method, corresponds to the roller freewheel described above. Reference is also made to the preceding description of the roller freewheel, which corresponds to an optional embodiment of the roller freewheel manufactured by means of the manufacturing method, and steps for manufacturing a roller freewheel that are explained there represent at least optionally a component of the manufacturing method shown here.

The ramp ring is made, for example, of metal and for this purpose, for example, continuously cast or deep-drawn from a raw sheet metal. Alternatively, the ramp ring is made of a plastic or reinforced plastic, and for example injection molded. Furthermore, the ramp ring is made, for example, from a ceramic material, for example by means of sintering, with the required axial length (see below or above) preferably being produced before solidification, i.e., in the phase as a green compact.

The torque is determined by the user of the roller freewheel or the external load and the mechanical relationship is specified so that the (maximum) transmittable torque can be determined therefrom.

The roller freewheel is redesigned or is a roller freewheel (system) from existing stock, for which all the key data are already known, in particular the (maximum) transmittable torque. The required number of roll body rows can then be determined. For example, two rolling bearing rows are required for a ramp ring with a raw length for a maximum of three rolling bearing rows.

Then, when the required number of roll body rows leads to such a total width that is less than the raw length of the ramp contour, the ramp ring is shortened to the required length, for example by means of cutting off. It should be pointed out at this point that a manufacturing facility that is designed to change the raw length of the ramp contour also falls under the underlying concept if this step is not carried out, for example is not necessary.

Finally, the roll body rows are introduced. In one embodiment, the roll body rows are introduced before the length of the ramp contour is adapted.

The roller freewheel may be designed according to an embodiment according to the description above.

In step e. the at least one roll body row may be pushed axially into the open side of a ramp ring, the ramp ring having an axial end stop on one side and an open side opposite thereto.

According to a further aspect, a manufacturing facility for carrying out the manufacturing method according to an embodiment according to the description above is proposed. It is also proposed in an advantageous embodiment of the manufacturing facility that a roller freewheel can be produced according to an embodiment as described above.

The manufacturing facility comprises at least one machine. In one embodiment, only the facility for manufacturing the ramp ring with the ramp contour in the raw length and for shortening, preferably cutting off, the ramp ring is included. In one embodiment, the facility for manufacturing the roll bodies, the roll body cage and/or other components as well as partial machining steps is also included.

BRIEF DESCRIPTION OF THE DRAWINGS

The roller freewheel is explained in detail below based on the relevant technical background with reference to the associated drawings, which show preferred embodiments. The drawings are purely schematic and should not be regarded as dimensionally accurate and suitable for defining proportions. In the figures.

DETAILED DESCRIPTION

Figure 1:
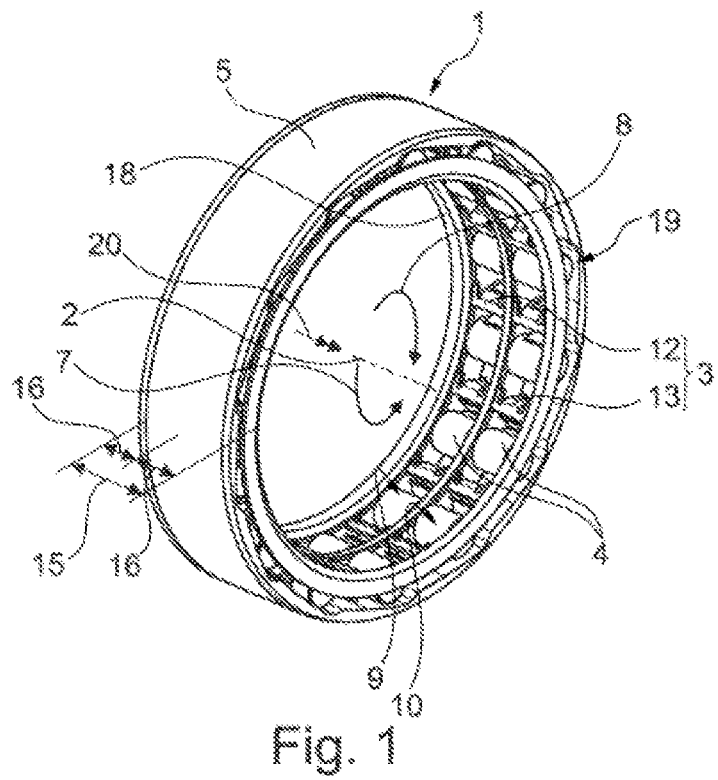
FIG. 1: shows a roller freewheel with two rolling bearing rows.

FIG. 1 shows a perspective view of a roller freewheel 1 in which a torque 20 (in the direction shown) can be transmitted (almost) loss-free about the axis of rotation 2 in the first direction of rotation 7 and no torque can be transmitted in the second direction of rotation 8. The first direction of rotation 7 and the second direction of rotation 8 are the relative directions of rotation based on a stationary ramp ring 5. A plurality of roll bodies 4 is provided in the ramp ring 5 for torque transmission depending on the direction of rotation. The roll bodies 4 are guided in a roll body cage 3 as a first roll body row 9 and a second roll body row 10 and are radially pretensioned against the ramp ring 5. The roll body cage 3 is subdivided here into a first partial cage 12 for the first roll body row 9 and a second partial cage 13 for the second roll body row 10. These two partial cages 12, 13 are preferably arranged in the ramp ring 5 such that they can be loosely rotated relative to one another. The ramp ring 5 is designed here with an end stop 18 and an open side 19 so that the roll bodies 4 in the roll body cage 3 can be pushed axially through the open side 19 into the ramp ring 5 up to the end stop 18. For the rotational torque transmission depending on the direction, the ramp ring 5 has a ramp contour 6, which can be clearly seen in FIGS. 2 and 3 and is therefore only referred to there. This ramp contour 6 has a length 15 that extends from the (optional) end stop 18 to the open side 19. In this embodiment, this length 15 corresponds to twice the width 16 of a partial cage 12, 13, so that the two partial cages 12, 13 are housed here exactly.

Figure 2:
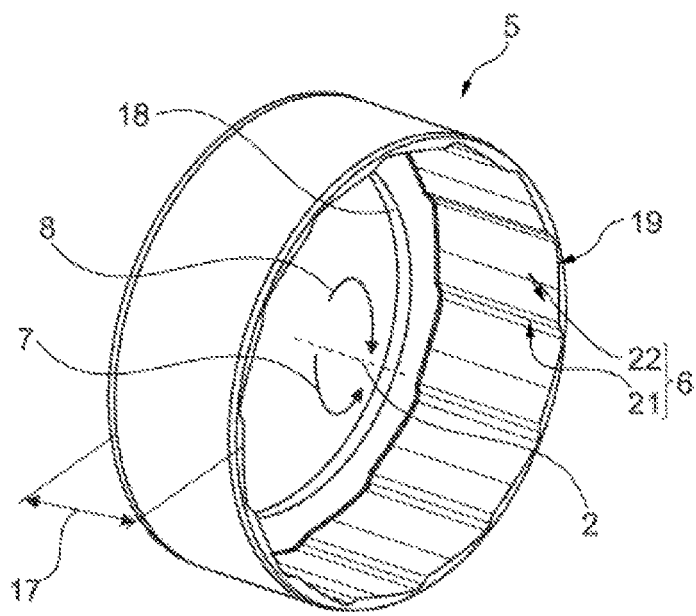
FIG. 2: shows a ramp ring with a raw length.
Figure 4:
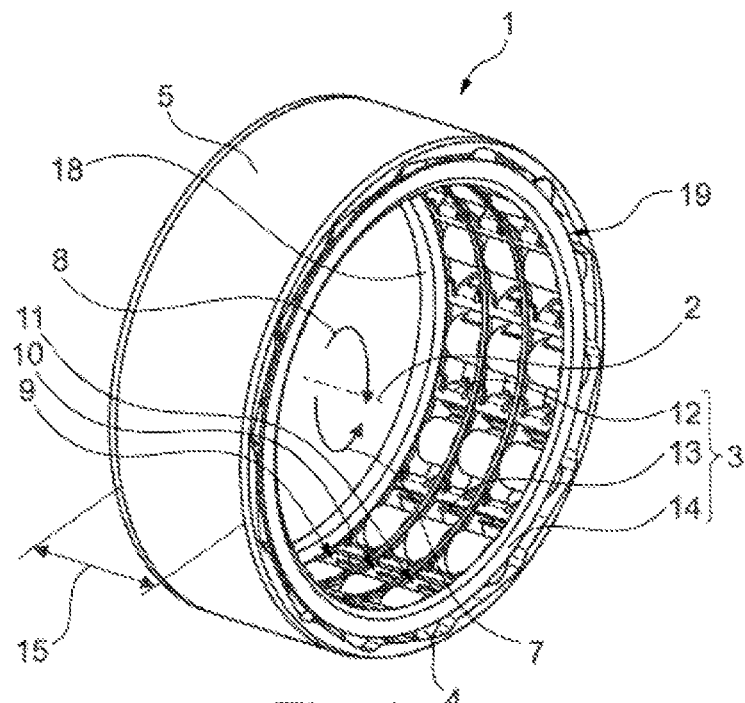
FIG. 4: shows a roller freewheel with three rolling bearing rows.

FIG. 2 shows a perspective view of a ramp ring 5 that is designed, for example, for the embodiment of the roller freewheel 1 according to FIG. 1 or FIG. 4. In the form shown, the ramp ring 5 has a raw length 17 that can be shortened to the required length 15 (see FIG. 1). The ramp contour 6 comprises a plurality of identical ramps (corresponding to the number of roll bodies 4 of a roll body row 9, 10, 11), each of which is divided into a steep ramp 21 for torque transmission (relative to the first direction of rotation 7 of the roll body rows 9, 10, 11 to the ramp ring 5) and a flat ramp 22 for (in the second direction of rotation 8 of the roll body rows 9, 10, 11 relative to the ramp ring 5) rolling over against the pretensioning by the roll body cage 3.

Figure 3:
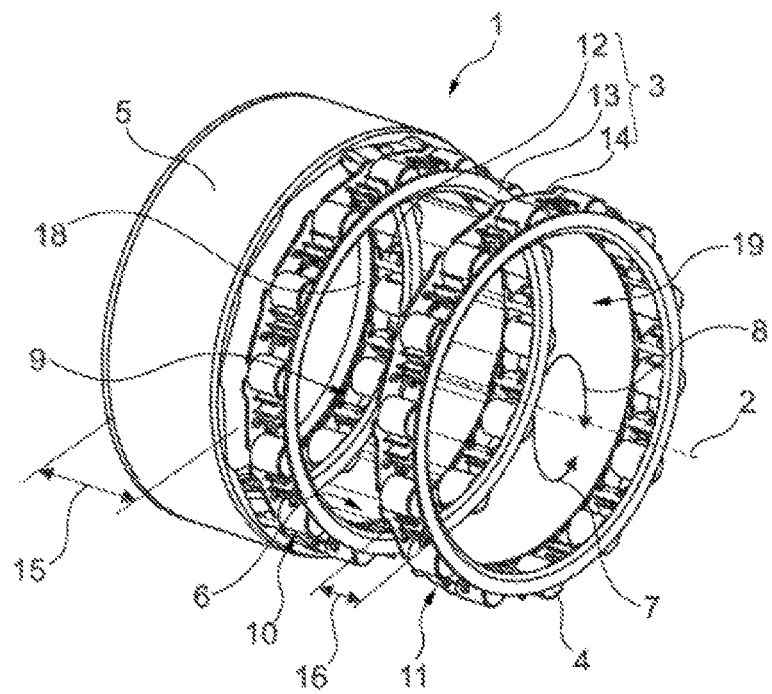
FIG. 3: shows a roller freewheel according to FIG. 4 in an exploded view.

FIG. 3 shows a roller freewheel 1, as shown in FIG. 4, in an exploded view, which the assembly step of the axial insertion (shown to the left) of the individual partial cages 12, 13 and 14 through the open side 19 to the end stop 18 reproduces. The length 15 corresponds here to the raw length 17 of the ramp ring 5 according to the representation in FIG. 2, so it has not been shortened. The length 15 of the ramp ring 5 according to FIG. 1, however, is shortened compared to the raw length 17 according to FIG. 2 (for two partial cages 12, 13). The length 15 here in FIG. 3 corresponds to three times the width 16 of the (identical) partial cages 12, 13 and 14, which are preferably also identical to the partial cages 12 and 13 in FIG. 1.

FIG. 4 shows the roller freewheel 1 according to FIG. 3 in the final state with three partial cages 12, 13 and 14 that guide the three rolling bearing rows 9, 10 and 11 and radially pretension their roll bodies 4 against the ramp contour 6 (see FIG. 3).

A cost-effective and flexible construction system for a variable transmittable torque is provided with the roller freewheel, the manufacturing method and the manufacturing facility proposed herein.

LIST OF REFERENCE SYMBOLS

1 Roller freewheel
2 Axis of rotation
3 Roll body cage
4 Roll body
5 Ramp ring
6 Ramp contour
7 First direction of rotation
8 Second direction of rotation
9 First roll body row
10 Second roll body row
11 Third roll body row
12 First partial cage
13 Second partial cage
14 Third partial cage
15 Length of the ramp contour
16 Width of a partial cage
17 Raw length
18 End stop
19 Open side
20 Torque
21 Steep ramp
22 Flat ramp

The invention claimed is:

1. A roller freewheel having an axis of rotation for a torque transmission depending on a direction of rotation, comprising:
   a roll body cage;
   a plurality of roll bodies, the roll bodies being housed in the roll body cage; and
   a ramp ring having a ramp contour for blocking the roll bodies with the ramp contour in a first direction of rotation and for allowing rotation of the roll bodies relative to the ramp ring in an opposite, second direction of rotation,
   wherein: the ramp contour of the ramp ring is designed to house a plurality of roll body rows;
   the roll body cage comprises a plurality of separate identical partial cages, each identical partial cage comprising at least one roll body row; and
   the ramp ring is produced by deep drawing.

2. The roller freewheel according to claim 1, wherein the identical partial cages each comprise exactly one roll body row.

3. The roller freewheel according to claim 1, wherein:
   the ramp contour has an axial length that corresponds to a sum of respective axial widths of the identical insertable partial cages, and
   the ramp ring has a raw length that is shortened to the axial length during manufacture of the ramp ring.

4. The roller freewheel according to claim 1, wherein the ramp ring has an axial end stop on one side and has an open side opposite thereto for axially receiving the roll body rows during assembly of the roller freewheel.

5. A manufacturing method for a roller freewheel, comprising at least the following steps:
   a. producing a ramp ring by deep drawing, the ramp ring having a ramp contour with a predetermined raw length;
   b. determining a torque to be transmitted in a first direction of rotation;
   c. determining a corresponding number of roll body rows in identical roll body cages, each having a certain width;
   d. adapting the raw length of the ramp contour to the width of the number of roll body rows determined in step c., wherein the raw length adapted in this way corresponds to a length of the ramp contour in a final state; and
   e. introducing the determined number of roll body rows into the adapted ramp ring.

6. The manufacturing method according to claim 5, wherein:
   the ramp ring has an axial end stop on one side and has an open side opposite thereto; and
   the determined number of roll body rows are pushed axially into the open side of the ramp ring.

7. A roller freewheel, comprising:
   a plurality of separate partial cages, each partial cage having at least one roll body row, the partial cages mounted to one another such that they can be loosely rotated relative to one another;
   a plurality of roll bodies, the roll bodies being housed in the partial cages; and
   a ramp ring having a ramp contour for blocking the roll bodies with the ramp contour in a first direction of rotation and for allowing rotation of the roll bodies relative to the ramp ring in an opposite, second direction of rotation, wherein:
   the ramp ring is produced by deep drawing; and
   the ramp ring is formed from a single piece of material having an integral axial end stop on one side and an open side opposite thereto.

8. The roller freewheel according to claim 7, wherein the partial cages are pushed axially into the open side during assembly of the roller freewheel.

* * * * *